(12) United States Patent
Jun

(10) Patent No.: US 11,546,496 B2
(45) Date of Patent: Jan. 3, 2023

(54) CAMERA MODULE AND CAMERA MODULE DRIVING MECHANISM

(71) Applicant: SAMSUNG ELECTRO-MECHANICS CO., LTD., Suwon-si (KR)

(72) Inventor: Jae Woo Jun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/467,510

(22) Filed: Sep. 7, 2021

(65) Prior Publication Data

US 2022/0182520 A1 Jun. 9, 2022

(30) Foreign Application Priority Data

Dec. 4, 2020 (KR) .......................... 10-2020-0168787

(51) Int. Cl.
*H04N 5/225* (2006.01)
*G02B 7/02* (2021.01)
(Continued)

(52) U.S. Cl.
CPC .............. *H04N 5/2257* (2013.01); *G02B 7/02* (2013.01); *G03B 30/00* (2021.01);
(Continued)

(58) Field of Classification Search
CPC ....... G02B 7/02; G03B 30/00; H04M 1/0264; H04M 2250/20; H04N 5/2253; H04N 5/2257
See application file for complete search history.

(56) References Cited

U.S. PATENT DOCUMENTS

2005/0200740 A1* 9/2005 Kim .................... H04M 1/0264
348/E5.025
2020/0366851 A1* 11/2020 Zhang ................. H04M 1/0208
(Continued)

FOREIGN PATENT DOCUMENTS

KR 10-2005-0092202 A 9/2005
KR 10-2005-0117207 A 12/2005
(Continued)

OTHER PUBLICATIONS

Yanachkov, Milen., "See How the Vivo NEX Pop-Up Selfie Camera Works on the Inside", , https://www.phonearena.com/news/vivo-nex-pop-up-selfie-camera-mechanism-teardown_id106082 Jun. 26, 2018 (3 pages in English).
(Continued)

*Primary Examiner* — Amy R Hsu
(74) *Attorney, Agent, or Firm* — NSIP Law

(57) ABSTRACT

A camera module is provided. The camera module includes an optical assembly including one or more lens and an image sensor, a first driving unit configured to move the optical assembly in a first direction to retract the optical assembly into a housing of an electronic device in which the optical assembly is disposed, or configured to move the optical assembly in a second direction, opposite to the first direction, so that the optical assembly protrudes externally from the housing, and a second driving unit configured to rotate the optical assembly in a protruding state based on a rotation axis, parallel to the first direction.

17 Claims, 15 Drawing Sheets

(51) Int. Cl.
*H04M 1/02* (2006.01)
*G03B 30/00* (2021.01)

(52) U.S. Cl.
CPC ........ *H04M 1/0264* (2013.01); *H04N 5/2253* (2013.01); *H04M 2250/20* (2013.01)

(56) References Cited

U.S. PATENT DOCUMENTS

| | | | |
|---|---|---|---|
| 2021/0051272 A1* | 2/2021 | Liu | H04N 5/2257 |
| 2021/0165183 A1* | 6/2021 | Kameyama | G03B 17/561 |
| 2022/0053075 A1 | 2/2022 | Ha et al. | |

FOREIGN PATENT DOCUMENTS

| | | | |
|---|---|---|---|
| KR | 10-2006-0006379 A | 1/2006 | |
| KR | 10-2006-0064255 A | 6/2006 | |
| KR | 10-2010-0072994 A | 7/2010 | |
| KR | 10-2020-0134436 A | 12/2020 | |

OTHER PUBLICATIONS

"Samsung Galaxy A80 Unveils, Pushing the Limits of Design Innovation", *Samsung Electronics*, http://news.samsungdisplay.com/18780, Apr. 10, 2021 (4 pages in English and 4 pages in Korean).

Korean Office Action dated Feb. 22, 2022 in corresponding Korean Patent Application No. 10-2020-0168787 (9 pages in English and 6 pages in Korean).

* cited by examiner

CAMERA MODULE AND CAMERA MODULE DRIVING MECHANISM

CROSS-REFERENCE TO RELATED APPLICATION(S)

This application claims the benefit under 35 USC § 119(a) of priority to Korean Patent Application No. 10-2020-0168787, filed on Dec. 4, 2020, in the Korean Intellectual Property Office, the entire disclosure of which is incorporated herein by reference for all purposes.

BACKGROUND

1. Field

The following description relates to a camera module and camera module driving mechanism.

2. Description of Related Art

Typically, portable electronic devices such as laptops, tablets, PDAs, mobile phones, and smartphones include a main body equipped with operation buttons such as a keypad and a display that outputs an image, and the main body and the display may be connected to a folding hinge device so as to be folded or unfolded.

Recently, as touch panels, displays that output images, but which enable the input and output of data, have been widely used. Accordingly, simpler and more compact electronic devices that do not include an operation button may be easily implemented.

Additionally, an electronic device may include a camera that captures images, or makes video calls, and the like, and the camera may generally be installed in a bezel of a back and/or front of a body of the electronic device. As described above, recent electronic devices have been developed to implement a simpler and more compact size thereof, and thus, if the camera is received in the body of the electronic device and exposed to be used as necessary, an exterior of the electronic device may be further simplified.

The above information disclosed in this Background section is only for enhancement of understanding of the background of the described technology, and therefore it may contain information that does not form the prior art that is already known in this country to a person of ordinary skill in the art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a camera module includes an optical assembly comprising at least one lens and an image sensor; a first driving unit, configured to move the optical assembly in a first direction to retract the optical assembly into a housing of an electronic device in which the optical assembly is disposed, or configured to move the optical assembly in a second direction, opposite to the first direction, so that the optical assembly protrudes externally from the housing; and a second driving unit, configured to rotate the optical assembly in a protruding position based on a rotation axis, parallel to the first direction.

The second driving unit may include a shaft connected to the optical assembly, and an actuator configured to rotate the shaft based on the rotation axis.

The shaft may be configured to be movable in a direction parallel to the first direction with respect to the second driving unit.

The second driving unit further may include a rotating element that interlocks with the actuator, and the shaft may be configured to rotate with the rotating element, and may be further configured to be slidable in a direction parallel to the first direction in the rotating element.

The shaft may be configured to be fitted into a hollow hole of the rotating element, the shaft may include a groove that extends to be parallel to the first direction on an outer circumferential surface thereof, and the rotating element may include a protrusion at least partially accommodated in the groove of the shaft.

The second driving unit may include an elastic member configured to provide a force that pushes the optical assembly in the second direction when the optical assembly is pressed in the first direction with respect to the second driving unit.

The second driving unit may include a rotating element, configured to rotate together with the optical assembly, and may include a protrusion that extends in a direction perpendicular to the rotation axis, and a stopper, configured to engage with the protrusion to limit a rotation range of the rotating element.

The second driving unit may include a sensor device, configured to detect an amount of rotation of the optical assembly.

The second driving unit may include a motor, a disk member fixedly coupled to an output shaft of the motor, and a power transmission element coupled to the disk member in a slipping manner to rotate the optical assembly, and rotation of the disk member may be transferred to the power transmission element by a frictional force between the disk member and the power transmission element.

The second driving unit may be configured to rotate the optical assembly based on the rotation axis, and the first driving unit may be configured to move the second driving unit in the first direction or the second direction.

The first driving unit may include a screw rod that extends in a direction parallel to the first direction, and the second driving unit may be configured to move in a direction parallel to the first direction as the screw rod rotates when engaged with a portion of the second driving unit.

In a general aspect, a camera module includes an optical assembly including at least one lens and an image sensor; and a driving unit, configured to rotate the optical assembly based on a first axis, wherein the driving unit is configured to control the optical assembly to slide in a direction parallel to the first axis with respect to the driving unit.

The driving unit may include a shaft connected to the optical assembly, and an actuator configured to rotate the shaft based on the first axis.

The driving unit may further include a rotating element that interlocks with the actuator, the shaft is fitted into a hollow hole of the rotating element, the shaft may include a groove that extends in a direction parallel to the first axis on an outer circumferential surface thereof, and the rotating element may include a protrusion at least partially accommodated in the groove of the shaft.

The driving unit may further include a spring fitted into the shaft, and when the optical assembly is pressed in a direction parallel to the first axis with respect to the driving unit, the spring may be compressed to provide a force pushing the optical assembly in the opposite direction.

In a general aspect, an electronic device includes a housing; a display, configured to be visible externally through a portion of the housing; and an optical assembly, configured to be retracted into the housing or protrude from the housing, and further configured to be rotatable based on an axis, parallel to a protruding direction in a protruding position, wherein the optical assembly is located on a rear area of the display when the optical assembly is retracted in the housing.

Other features and aspects will be apparent from the following detailed description, the drawings, and the claims.

Figure 1:
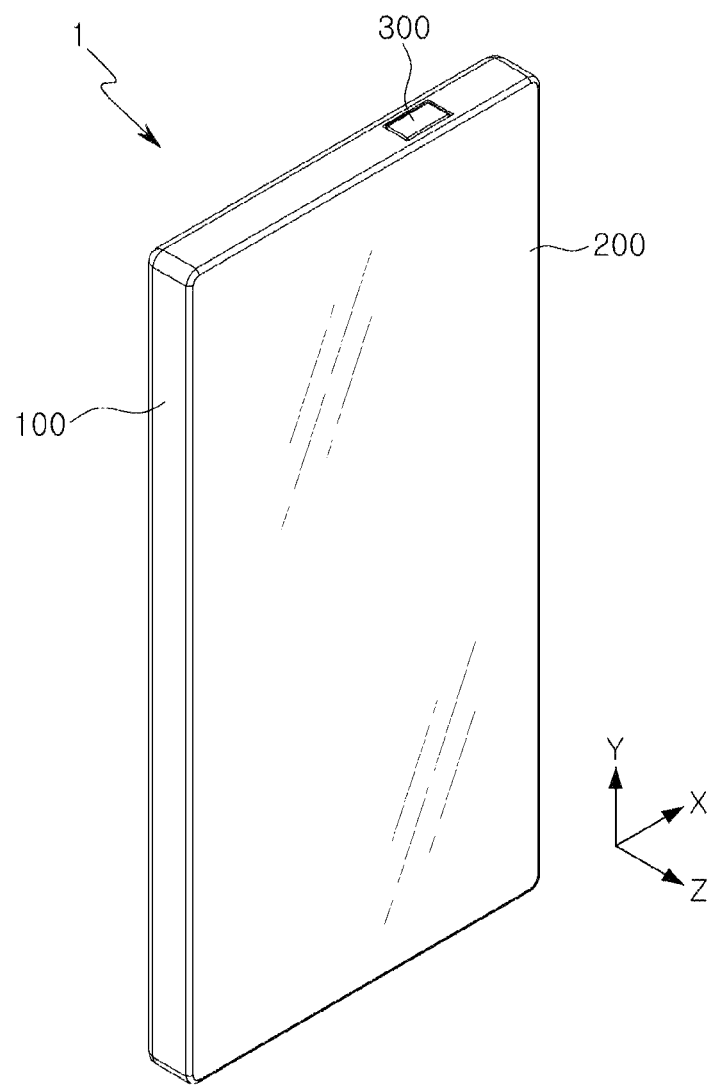
FIG. 1 illustrates an example in which a camera is received in an example electronic device, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Figure 2:
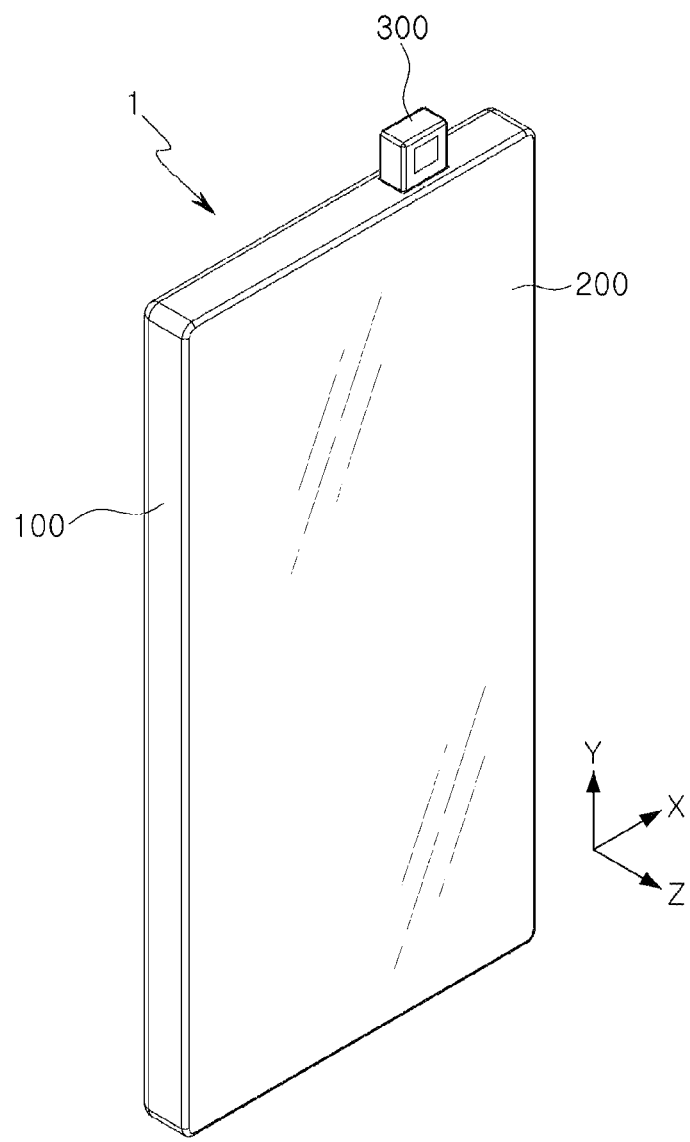
FIG. 2 illustrates an example in which a camera protrudes from an example electronic device and is exposed, in accordance with one or more embodiments.
Figure 3:
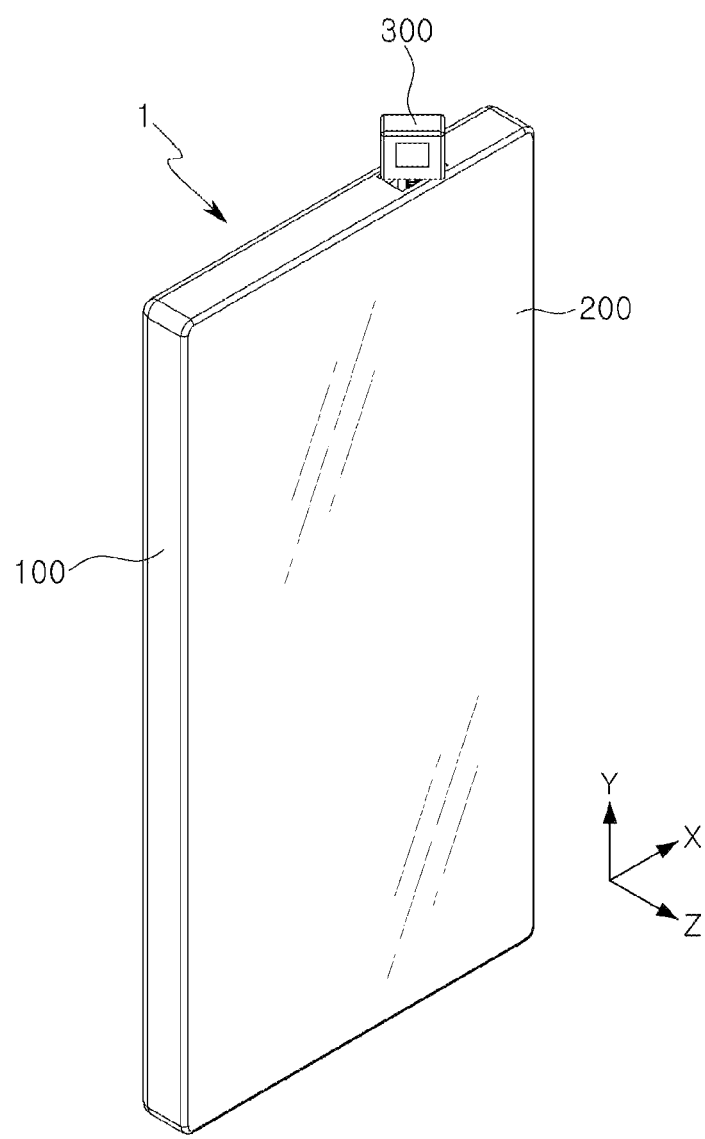
FIG. 3 illustrates an example in which a protruding camera is rotated, in accordance with one or more embodiments.

FIGS. 1 to 3 illustrate an example electronic device 1 which includes a pop-up or retractable camera, in accordance with one or more embodiments. FIG. 1 illustrates an example in which the camera is received or implemented within the electronic device 1, FIG. 2 illustrates an example in which the camera protrudes from the electronic device 1 so as to be in an exposed state, and FIG. 3 illustrates an example in which the protruding camera is rotated.

In an example, the electronic device 1 may include a housing 100, a display 200, and an optical assembly 300. The optical assembly 300 may include at least one lens and an image sensor. An autofocusing or optical image stabilization (OIS) function may be provided by relative movement of the one or more lens and an image sensor. In this example, the optical assembly may further include an actuator that drives the lens or the image sensor. The actuator may include, as examples, a voice coil motor, a shape memory alloy wire, or a micro electro mechanical systems (MEMS) actuator. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The display 200 may be visually recognized to the outside through a portion of the housing 100. A front surface of the electronic device 1 may include a display portion 200 and a bezel portion surrounding the display portion 200. Since the display 200 does not have high transmittance, a front camera provided in the typical electronic device may be disposed in the bezel portion so as not to overlap the display 200. Due to the front camera, it may be difficult to reduce a thickness of the bezel portion, which makes it difficult to implement a full front display 200 in which the display 200 occupies most of the front surface of the electronic device 1.

In order to solve this, the front camera may be disposed on the back of the display 200 and a hole may be formed in a portion of the display 200 so as not to impair light-receiving performance of the camera. However, there is a problem in that the exterior of the electronic device is damaged due to the punch hole provided in the display 200 or a black spot corresponding to the punch hole is always visible in an image displayed on the display 200.

In an example, the optical assembly 300 may selectively protrude externally from the electronic device 1. The optical assembly 300 may protrude externally from the housing 100 when the camera function is activated, and may retract into, or be received in, the housing 100 in an inactive state. This eliminates the need for a thick bezel for the front camera, which may help the electronic device 1 provide the full front display 200.

In an embodiment, the optical assembly 300 is provided to pop up from the housing 100. When the optical assembly 300 pops up, the optical assembly 300 may protrude externally from the housing 100 to capture an image. The pop-up optical assembly 300 may rotate about an axis, parallel to the pop-up direction. In an example, the pop-up optical assembly 300 may image a subject in a wide range while rotating to the left and right directions. When the optical assembly 300 is received in the housing 100, the optical assembly may be located on the rear surface of the display 200. That is, when the electronic device is viewed from the front, the optical assembly 300 may be covered by the display 200.

Figure 4:
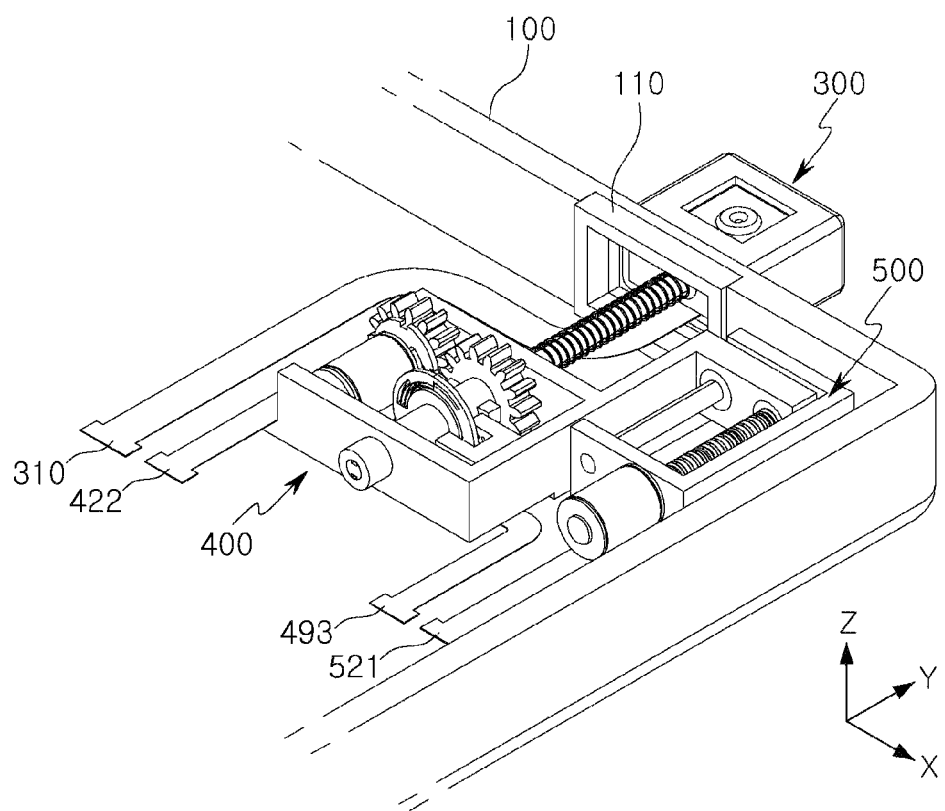
FIG. 4 is a perspective view of an example driving unit, in accordance with one or more embodiments.
Figure 5:
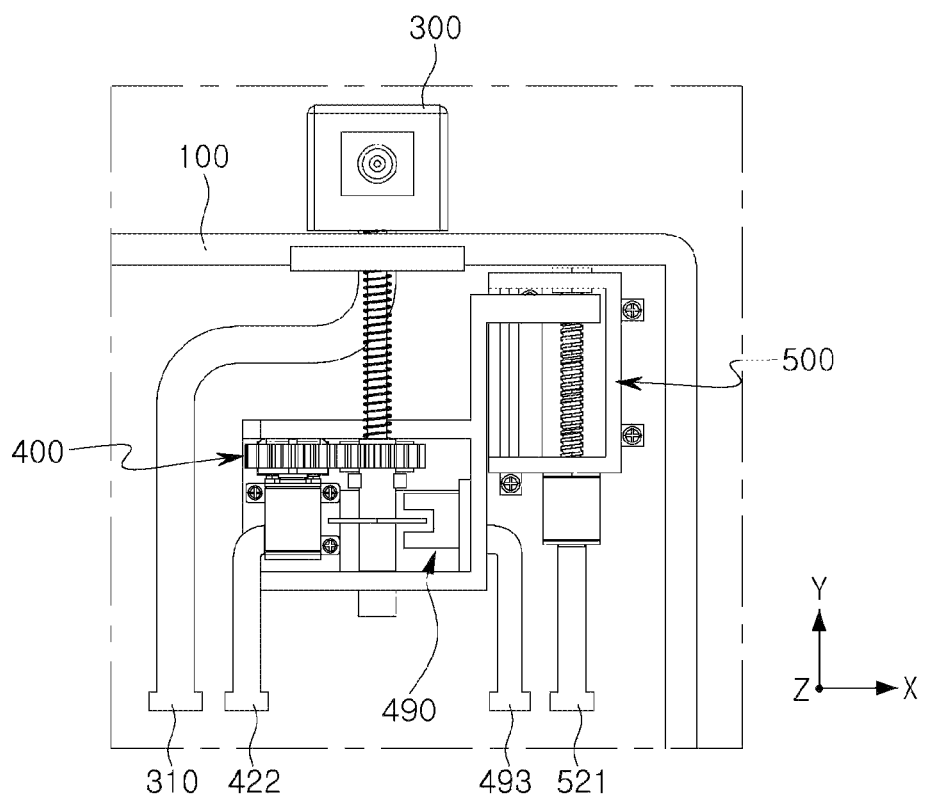
FIG. 5 is a front view of an example driving unit, in accordance with one or more embodiments.
Figure 6:
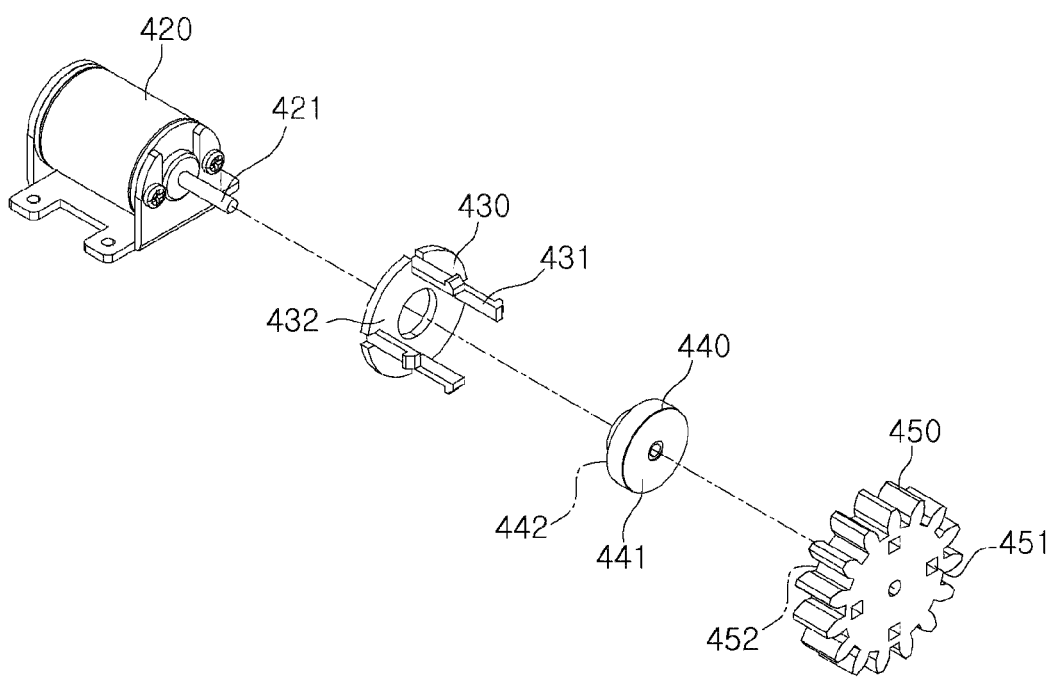
FIGS. 6 and 7 are exploded perspective views of an example rotation driving unit, in accordance with one or more embodiments.
Figure 7:
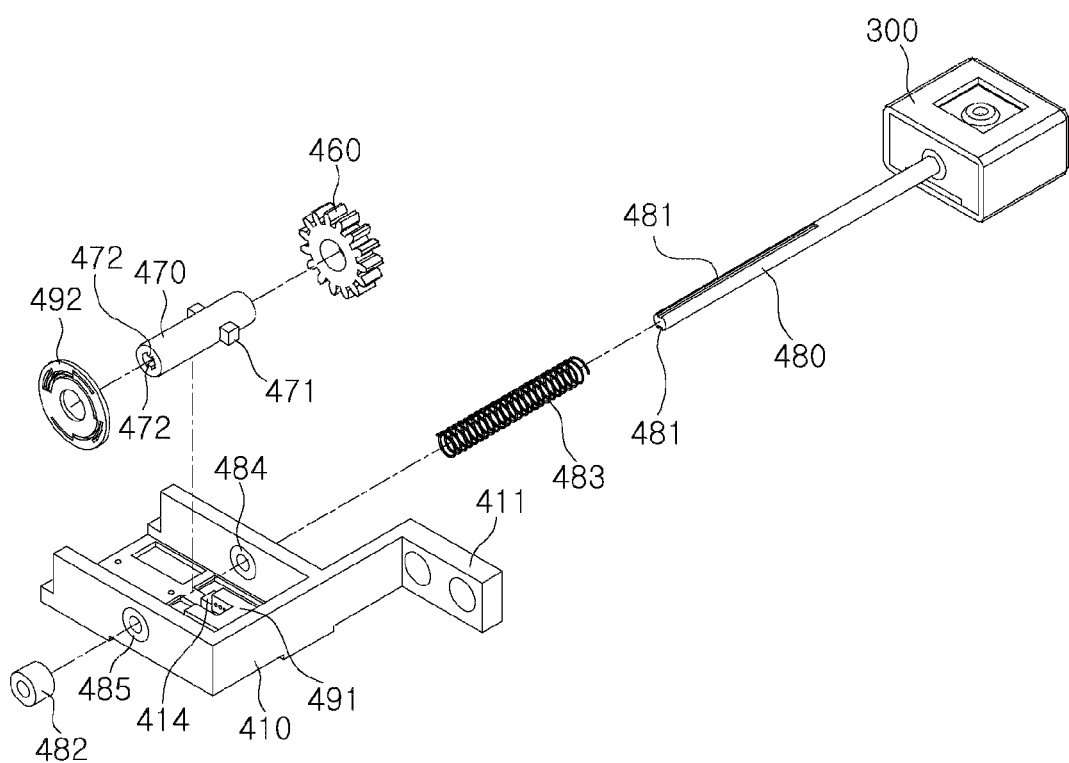
Figure 8:
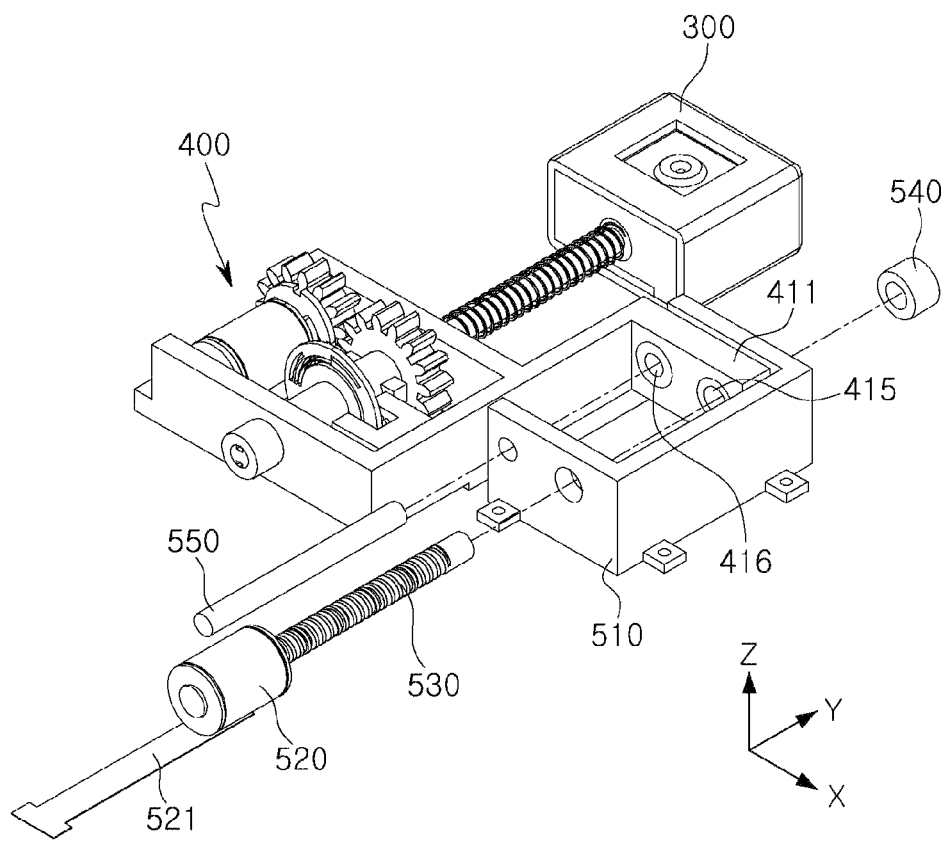
FIG. 8 is an exploded perspective view of an example pop-up driving unit, in accordance with one or more embodiments.

FIGS. 4 to 8 are diagrams illustrating an example driving unit of an example camera module, in accordance with one or more embodiments. FIG. 4 is a perspective view of an example driving unit, in accordance with one or more embodiments. FIG. 5 is a front view of an example driving unit, in accordance with one or more embodiments. FIGS. 6 and 7 are exploded perspective views of an example rotation driving unit, in accordance with one or more embodiments. FIG. 8 is an exploded perspective view of an example pop-up driving unit, in accordance with one or more embodiments.

Figure 9:
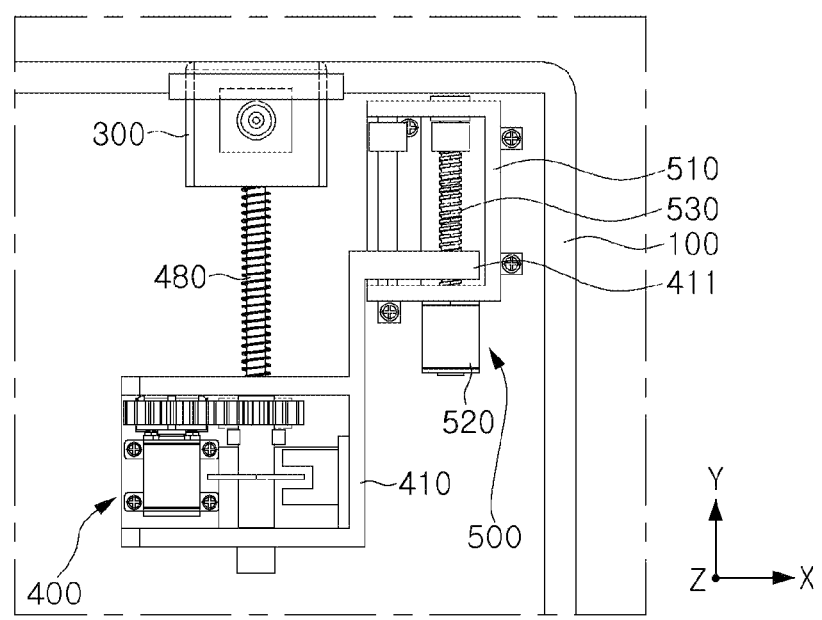
FIG. 9 illustrates an example in which an example optical assembly is received, in accordance with one or more embodiments.
Figure 10:
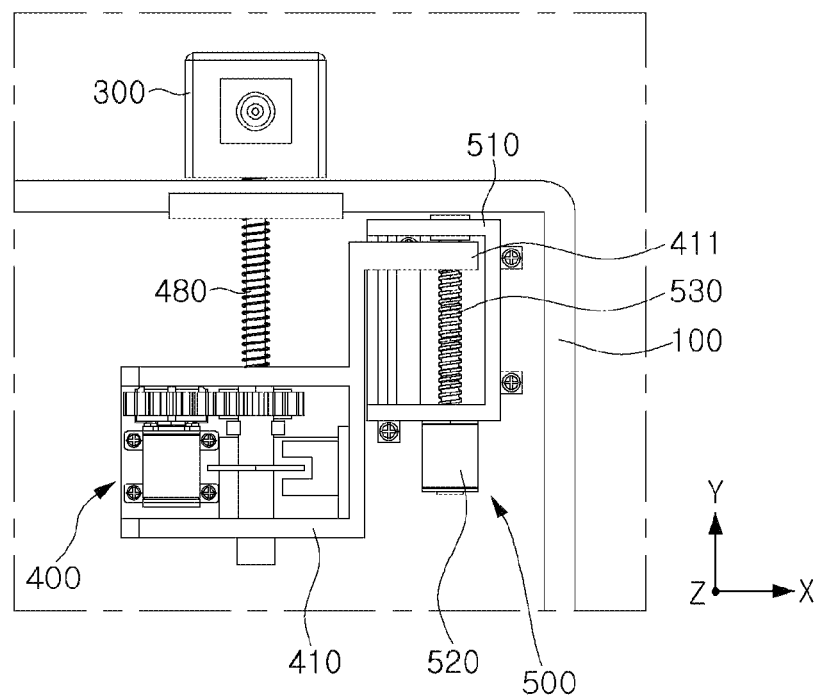
FIG. 10 illustrates an example in which an example optical assembly pops up, in accordance with one or more embodiments.
Figure 11:
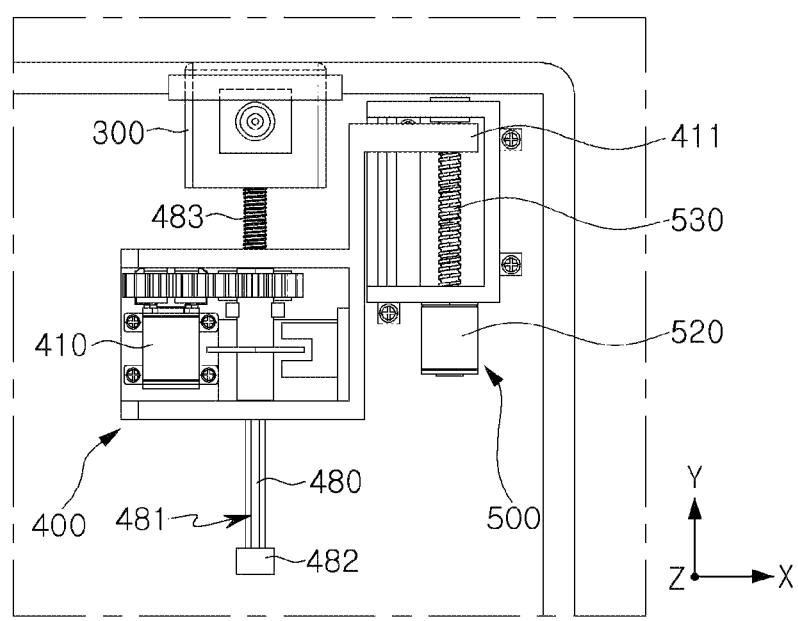
FIG. 11 illustrates an example where an example pop-up optical assembly is forcibly pressed, in accordance with one or more embodiments.
Figure 12:
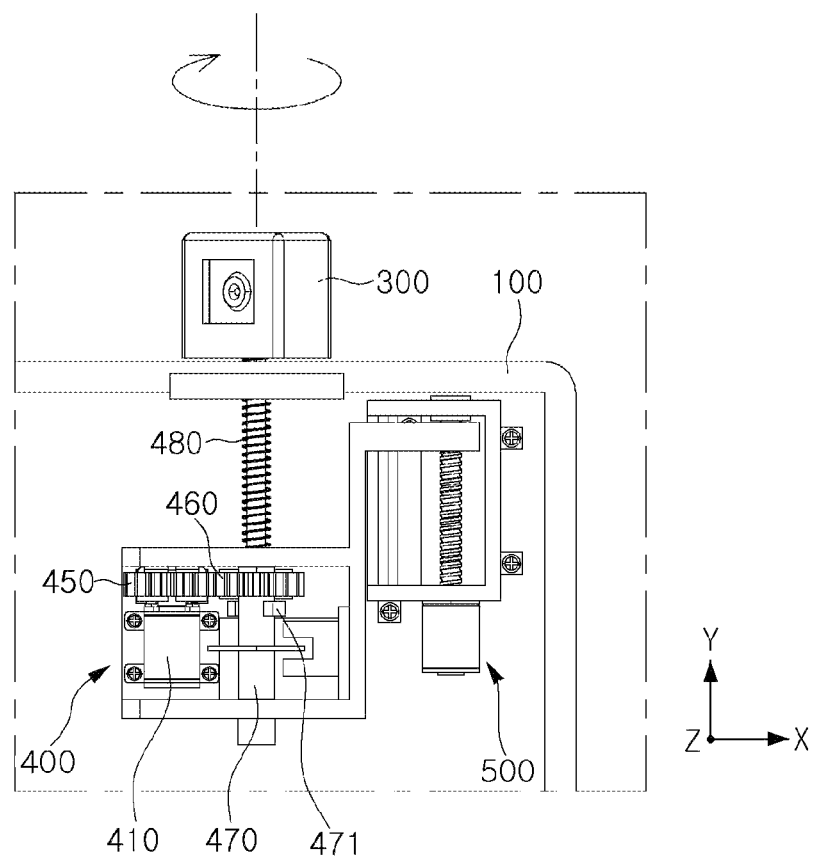
FIGS. 12 and 13 illustrate an example where an example pop-up optical assembly is rotated, in accordance with one or more embodiments.
Figure 13:
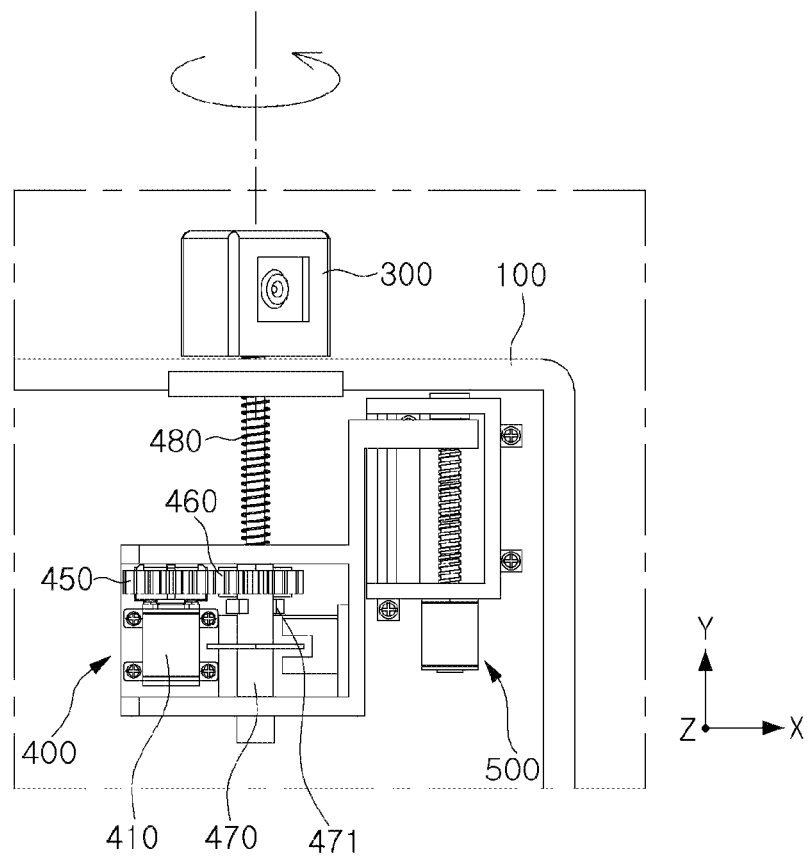
Figure 14:
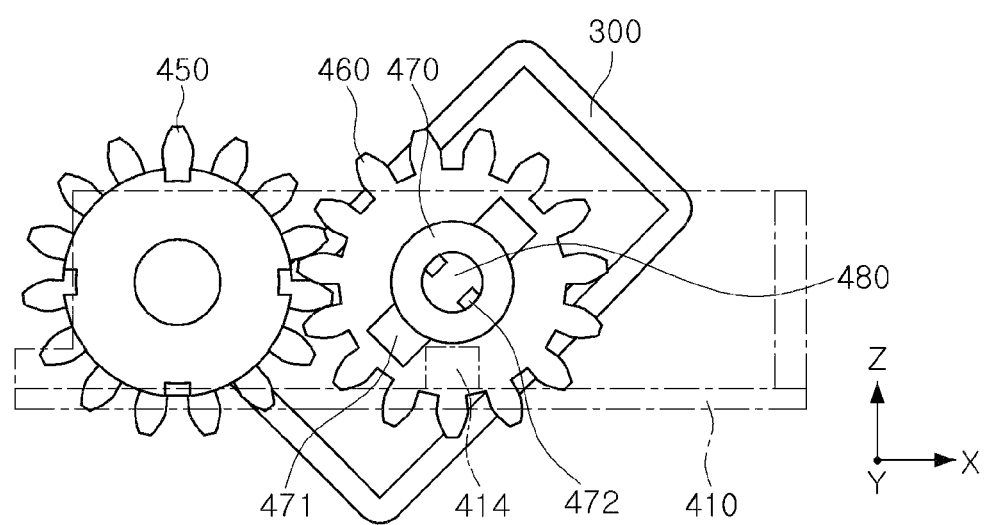
FIGS. 14 and 15 illustrate an example mechanism that limits a rotation angle of an example pop-up optical assembly, in accordance with one or more embodiments.
Figure 15:
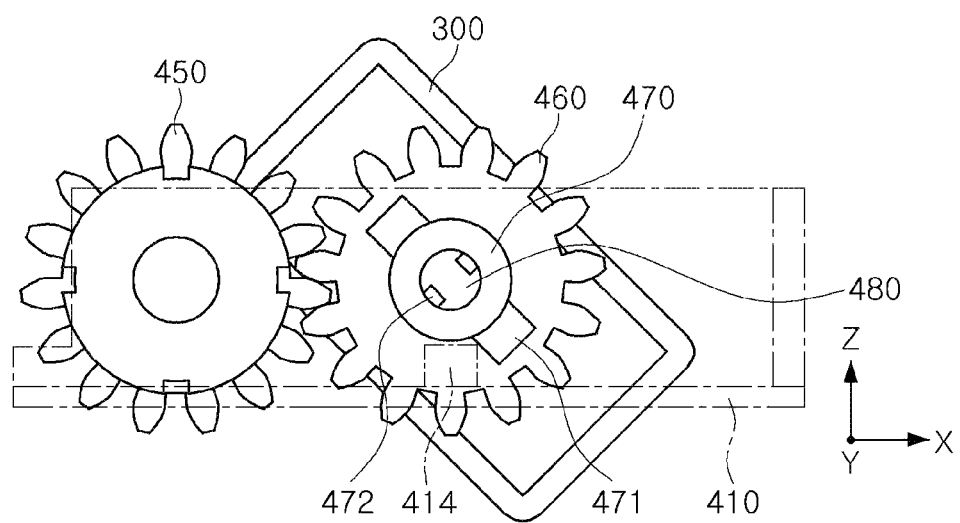

FIG. 9 illustrates an example in which the optical assembly 300 is received or retracted, in accordance with one or more embodiments. FIG. 10 illustrates an example in which the optical assembly 300 pops up, in accordance with one or more embodiments. FIG. 11 illustrates an example where the pop-up optical assembly 300 is forcibly pressed. FIGS. 12 and 13 illustrate an example when the pop-up optical assembly 300 is rotated. FIGS. 14 and 15 illustrate an example mechanism that limits an angle of rotation of the pop-up optical assembly 300.

In an example, the camera module may include an optical assembly 300 and a driving unit that moves the optical assembly 300 with respect to the housing 100. In an example, the camera module may include a pop-up driving unit 500 (or a first driving unit) that selectively extends the optical assembly 300 externally from the housing 100. The pop-up driving unit 500 is provided to extend the optical assembly 300 externally from the housing 100, or retract the optical assembly 300 into the housing 100. The pop-up driving unit 500 may move the optical assembly 300 in a first direction to extend out of the housing 100, or move the optical assembly 300 in a second direction, opposite to the first direction, so as to be received in the housing 100.

In an example, the optical assembly 300 may be provided in a rotation driving unit 400 to be described later, and the pop-up driving unit 500 may pop up or retract the optical assembly 300 by moving the rotation driving unit 400. That is, the pop-up driving unit 500 may move the optical assembly 300 and the rotation driving unit 400 as a whole in a pop-up direction. Details of the pop-up driving unit 500 will be described after the description of the rotation driving unit 400.

In an example, the camera module may include the rotation driving unit 400 (or a second driving unit) that rotates the optical assembly 300. The rotation driving unit 400 may adjust a direction in which the pop-up camera faces within an allowable angle range.

In an example, the rotation driving unit 400 may rotate the optical assembly 300 based on an axis, parallel to the pop-up direction (i.e., the Y direction). In an example, the rotation driving unit 400 may include a moving bracket 410, a motor 420 installed in the moving bracket 410, and mechanical elements connecting the motor 420 and the optical assembly 300.

In an example, the rotation driving unit 400 may include a shaft 480 fixedly connected to the optical assembly 300. The shaft 480 may extend in a direction parallel to the pop-up direction of the optical assembly 300, and may be rotatably installed in the moving bracket 410. In an example, bearings 484 and 485 may be mounted in the moving bracket 410, and the shaft 480 may be fitted to the bearings 484 and 485. The optical assembly 300 may be provided at one end of the shaft 480, and a fixing member 482 may be coupled to the other end thereof. The fixing member 482 provided at the other end may set a limit at which the shaft 480 may move as much as possible in the +Y direction with respect to the moving bracket 410 and may be provided to prevent the shaft 480 from escaping from the moving bracket 410.

In an example, the shaft 480 may be coupled to a rotating element 470 that is rotated by the motor 420. In an example, the rotating element 470 may have a hollow cylindrical shape, and the shaft 480 may be fitted into a hollow hole of the rotating element 470. The rotating element 470 may include a protrusion 472 extending in a central direction from an inner surface defining the hollow hole. The protrusion 472 may be at least partially received in a groove 481 of the shaft 480. When the rotating element 470 rotates, the protrusion 472 pushes one side of the groove 481, and accordingly, the shaft 480 may rotate at the same angular velocity as the rotating element 470.

In an example, the rotating element 470 and the motor 420 may be connected by a power transmission element. In an example, a first power transmission element 450 may be provided in an output shaft 421 of the motor 420, and a second power transmission element 460 mechanically interlocked with the first power transmission element 450 may be provided in the rotating element 470. In an example, the first power transmission element 450 and the second power transmission element 460 may be a gear pair. As another example, the first power transmission element 450 and the second power transmission element 460 may be interlocked by a belt surrounding both. In an embodiment, the second power transmission element 460 may be fitted into and coupled to the rotating element 470 or may be formed integrally with the rotating element 470.

In an example, the shaft 480 may be provided to be movable in a direction parallel to the pop-up direction (i.e., the Y direction) with respect to the rotation driving unit 400. In an example, the shaft 480 may include the groove 481 extending parallel to the pop-up direction on an outer circumferential surface thereof, and the rotating element 470 may include the protrusion 472 extending toward the center is at least partially received in the groove 481 of the shaft 480. When the rotating element 470 rotates in a state in which the protrusion 472 is received in the groove 481, the protrusion 472 transfers torque to the shaft 480. The shaft 480 may include two grooves 481 spaced apart from each other. In the illustrated embodiment, the two grooves 481 may be provided in a front portion (+Z direction) and a rear portion (−Z direction) of the shaft 480, respectively. The protrusion 472 provided in the rotating element 470 may also be provided in two positions corresponding to the two grooves 481.

The protrusion 472 may only restrict the shaft 480 from rotating relative to the rotating element 470 and does not restrict the shaft 480 from moving along the groove 481 relative to the rotating element 470. That is, the protrusion 472 is fitted into the groove 481 and the shaft 480 always moves at the same angular velocity as the rotating element 470, but the shaft 480 may slide in a direction (e.g., the pop-up direction) in which the groove 481 extends with respect to the rotating element 470. The optical assembly 300 connected to the end of the shaft 480 may also slide in the pop-up direction with respect to the rotation driving unit 400.

In an example in which the optical assembly 300 protrudes externally from the housing 100 based on an operation of the pop-up driving unit 500, if the optical assembly 300 is forcibly pressed, the camera module may be damaged. The optical assembly 300 may need to be drawn into the housing 100 when pressed in a pop-up state or position even if the pop-up driving unit 500 does not operate. In an example, since the shaft 480 connected to the optical assembly 300 may slide in the pop-up direction with respect to the rotation driving unit 400 regardless of the driving of the pop-up driving unit 500, the above problem may be solved. However, the pop-up optical assembly 300 may slide with respect to the rotation driving unit 400 when an external force is applied, and the optical assembly 300 may maintain the pop-up state or position without the external force.

In an example, the rotation driving unit 400 may include an elastic or spring member 483 that provides a restoring force when the optical assembly 300 slides with respect to the rotation driving unit 400. In an example, in the example of FIG. 10, when the user forcibly presses the optical assembly 300 into the housing 100 (i.e., in the −Y direction), the optical assembly 300 may slide in the −Y direction with respect to the rotation driving unit 400. In this example, the elastic member 483 may provide a restoring force to the optical assembly 300 so that the optical assembly 300 may pop up again.

In an example, the elastic member 483 may be a coil spring fitted to the shaft 480. The coil spring may be provided between the moving bracket 410 of the rotation driving unit 400 and the optical assembly 300, and may be compressed when the optical assembly 300 is close to the bracket to provide a force to extend the optical assembly 300 again. The coil spring may be initially installed to be compressed between the moving bracket 410 and the optical assembly 300. The coil spring may provide a force that pushes the optical assembly 300 from the moving bracket 410 in the +Y direction, but the fixing member 482 provided at one end of the shaft 480 prevents the optical assembly 300 from escaping.

In an example, a disk member 440 (FIG. 6) may be fixedly provided on the output shaft 421 of the motor 420. The disk member 440 may rotate according to the driving of the motor 420.

In an example, the first power transmission element 450 may rotate according to a rotation of the disk member 440. The disk member 440 and the first power transmission element 450 may be provided in contact with each other. In an example, one surface 441 of the disk member 440 and one surface 452 of the first power transmission element 450 may contact each other. When the disk member 440 rotates by frictional force between the disk member 440 and the first power transmission element 450, the first power transmission element 450 may also rotate.

In an example, rotational slip may occur between the first power transmission element 450 and the disk member 440. The rotation slip refers to angular velocity of the disk member 440 and angular velocity of the first power transmission element 450 being different, and thus, the disk member 440 and the first power transmission element 450 rotate separately with respect to each other. In an example, when the motor 420 is not driven, if a force greater than frictional force (between the first power transmission element 450 and the disk member 440) acts on the first power transmission element 450, the first power transmission element 450 may rotate relative to the disk member 440.

If the first power transmission element 450 does not rotate at all when the motor 420 does not operate, elements (e.g., the shaft 480) constituting the rotation driving unit 400 may be damaged when the user of the electronic device 1 forcibly rotates the popped-up optical assembly 300. In an embodiment, since the first power transmission element 450 is provided to be rotatable even when the motor 420 does not operate, the above problem may be prevented.

In an example, the first power transmission element 450 may be coupled to the disk member by a coupling member 430. The coupling member 430 may include a disk-shaped plate and a plurality of protruding pins 431 extending from the plate toward the first power transmission element 450. Hooks may be provided at the ends of the protruding pins 431. The plurality of protruding pins 431 may be fitted into the hole 451 provided in the first power transmission element 450. When the coupling member 430 is completely fitted into the first power transmission element 450, the coupling member 430 is not separated from the first power transmission element 450 by the hook.

The coupling member 430 and the first power transmission element 450 may be coupled with the disk member 440 therebetween, and the coupling member 430 and the first power transmission element 450 press the disk member 440 from both sides. Accordingly, frictional force may be generated between the disk member 440 and the first power transmission element 450. Also, frictional force may be generated between one surface 442 of the disk member 440 and one surface 432 of the coupling member 430.

Referring to FIG. 7, in an example, the rotation driving unit 400 may include a stopper 414 that limits a rotation range of the optical assembly 300. In an example, the rotating element 470, that rotates together with the optical assembly 300, may interfere with the stopper 414 provided in the moving bracket 410. The rotating element 470 may include a radially extending protrusion 471, and when the rotating element 470 is rotated by a predetermined angle, the protrusion 471 may be caught by the stopper 414 to prevent further rotation.

Referring to FIG. 14, when the optical assembly 300 rotates by a predetermined angle in the counterclockwise direction, the protrusion 471 interferes, or is engaged, with the stopper 414 so that the optical assembly 300 cannot rotate in the counterclockwise direction anymore.

Referring to FIG. 15, when the optical assembly 300 rotates at a predetermined angle in the clockwise direction, the protrusion 471 may interfere, or engage, with the stopper 414 and the optical assembly 300 cannot rotate in the clockwise direction anymore.

Referring to FIG. 5, in an example, the rotation driving unit 400 may include a sensor device 490 that detects a rotation amount of the optical assembly 300. The sensor device 490 may include an encoder. Referring to FIG. 7, the sensor device 490 may include a disk 492 and a detection unit 491 that detects a rotation amount of the disk 492. The disk 492 of the sensor device 490 may be coupled to the rotating element 470 to rotate with the optical assembly 300, and the detection unit 491 may be fixedly provided in the moving bracket 410. The detection unit 491 may include a light source and a light receiving portion, and the amount of rotation of the disk 492, that is, the optical assembly 300, may be measured based on a difference between light output from the light source and light detected by the light receiving portion.

Referring to FIG. 8, in an example, the pop-up driving unit 500 may include a fixing bracket 510, a motor 520 installed in the fixing bracket 510, and a screw rod 530 connected to the motor 520. The fixing bracket 510 is fixedly coupled to the housing 100 of the electronic device 1. In an example, the screw rod 530 may extend parallel to the pop-up direction. The screw rod 530 may include a thread running in a length direction of the screw rod 530 on an outer circumferential surface thereof.

The pop-up driving unit 500 may pop-up or receive the optical assembly 300 by moving the moving bracket 410 in the Y direction. In an example, a portion of the rotation driving unit 400 may be engaged with the screw rod 530. In an example, the fixing bracket 510 may be provided in a channel shape, and a portion of the rotation driving unit 400 may extend into a space defined by the fixing bracket 510 so as to be coupled to the screw rod 530.

In an example, the moving bracket 410 of the rotation driving unit may include an extension 411 that is screw-coupled to the screw rod 530. The extension 411 may include a through hole, and a separate member 415 fitted into the through hole may have a screw hole corresponding to the screw rod 530. As the screw rod 530 rotates in a state of being engaged with the extension 411, the rotation driving unit 400 may move in a length direction (i.e., the Y direction) of the screw rod 530 with respect to the pop-up driving unit 500.

Referring to FIG. 9, in an example, the pop-up driving unit 500 may further include an auxiliary shaft 480. The auxiliary shaft 480 may be provided on one side of the screw rod 530 to guide the moving bracket 410 to move stably in the Y direction. In an example, the auxiliary shaft 480 may be fitted to a sliding bearing 416 mounted in the extension 411. The sliding bearing 416 helps the moving bracket 410 smoothly move along the auxiliary shaft 480 by reducing friction between the sliding bearing 416 and the auxiliary shaft 480.

Referring to FIGS. 4 and 5, the camera module may include substrates 310, 422, 493, and 521 extending from each of the optical assembly 300, the rotation driving unit 400, and the pop-up driving unit 500. The substrate extending from the rotation driving unit 400 may include a portion 422 connected to the motor 520 and a portion 493 connected to the sensor device 490.

Referring to FIG. 9, the optical assembly 300 is received in the housing 100. Here, the extension 411 of the moving bracket 410 is located below the screw rod 530. When the moving bracket 410 moves upwardly of the screw rod 530 according to rotation of the motor 520 (or the screw rod 530), the optical assembly 300 protrudes externally from the housing 100 as shown in FIG. 10. Here, a length of the elastic member 483 provided between the moving bracket 410 and the optical assembly 300 does not change.

When a force in the −Y direction is applied to the optical assembly 300 in the popped-up state or position, the optical assembly 300 may be received in the housing 100 as shown in FIG. 11. Here, the extension 411 of the moving bracket 410 is still positioned above the screw rod 530. That is, the optical assembly 300 may be received in the housing 100 by an external force in a state in which the pop-up driving unit 500 is not driven. Here, a length of the elastic member 483 provided between the optical assembly 300 and the moving bracket 410 is reduced. The elastic member 483 provides a force that pushes the optical assembly 300 back in the +Y direction, and when the external force applied to the optical assembly 300 disappears, the optical assembly 300 may protrude externally from the housing 100 again.

The optical assembly 300 in the popped-up state or position may rotate based on an axis, parallel to the pop-up direction by the rotation driving unit 400 as shown in FIGS. 13 and 14. The shaft 480 may be rotated by the motor 420 of the rotation driving unit 400, and the optical assembly 300 connected to the shaft 480 may be rotated. The pop-up optical assembly 300 may be rotated by an external force without driving the motor 520. A user may pick up and rotate the optical assembly 300. This is because the first power transmission element 450 is provided to rotate at a speed different from that of the motor 520.

As set forth above, the camera module according to an embodiment in the present disclosure may provide a pop-up camera device having a compact size and an electronic device including the same.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as

What is claimed is:

1. A camera module, comprising:
an optical assembly comprising at least one lens and an image sensor;
a first driving unit, configured to move the optical assembly in a first direction to retract the optical assembly into a housing of an electronic device in which the optical assembly is disposed, or configured to move the optical assembly in a second direction, opposite to the first direction, so that the optical assembly protrudes externally from the housing; and
a second driving unit, configured to rotate the optical assembly in a protruding position based on a rotation axis, parallel to the first direction,
wherein the optical assembly is configured to bypass an operation of the first driving unit and slide in the second direction when an external force is applied to the optical assembly in the second direction.

2. The camera module of claim 1, wherein the second driving unit comprises a shaft connected to the optical assembly, and an actuator configured to rotate the shaft based on the rotation axis.

3. The camera module of claim 2, wherein the shaft is configured to be movable in a direction parallel to the first direction with respect to the second driving unit.

4. The camera module of claim 2, wherein the second driving unit further comprises a rotating element that interlocks with the actuator, and the shaft is configured to rotate with the rotating element, and is further configured to be slidable in a direction parallel to the first direction in the rotating element.

5. The camera module of claim 4, wherein the shaft is configured to be fitted into a hollow hole of the rotating element, the shaft includes a groove that extends to be parallel to the first direction on an outer circumferential surface thereof, and the rotating element includes a protrusion at least partially accommodated in the groove of the shaft.

6. The camera module of claim 2, wherein the second driving unit comprises an elastic member configured to provide a force that pushes the optical assembly in the second direction when the optical assembly is pressed in the first direction with respect to the second driving unit.

7. The camera module of claim 1, wherein the second driving unit comprises a rotating element, configured to rotate together with the optical assembly, and comprising a protrusion that extends in a direction perpendicular to the rotating axis, and a stopper, configured to engage with the protrusion to limit a rotation range of the rotating element.

8. The camera module of claim 1, wherein the second driving unit comprises a sensor device, configured to detect an amount of rotation of the optical assembly.

9. The camera module of claim 1, wherein:
the second driving unit comprises a motor, a disk member fixedly coupled to an output shaft of the motor, and a power transmission element coupled to the disk member in a slipping manner to rotate the optical assembly, and
rotation of the disk member is transferred to the power transmission element by a frictional force between the disk member and the power transmission element.

10. The camera module of claim 1, wherein:
the second driving unit is configured to rotate the optical assembly based on the rotation axis, and
the first driving unit is configured to move the second driving unit in the first direction or the second direction.

11. The camera module of claim 10, wherein:
the first driving unit comprises a screw rod that extends in a direction parallel to the first direction, and
the second driving unit is configured to move in a direction parallel to the first direction as the screw rod rotates when engaged with a portion of the second driving unit.

12. A camera module, comprising:
an optical assembly including at least one lens and an image sensor;
a first driving unit, configured to control a movement of the optical assembly;
a second driving unit, configured to rotate the optical assembly based on a first axis,
wherein the second driving unit is configured to control the optical assembly to slide in a direction parallel to the first axis with respect to the driving unit, and
wherein the optical assembly is configured to bypass an operation of the first driving unit and slide in the second direction when an external force is applied to the optical assembly in the second direction.

13. The camera module of claim 12, wherein the second driving unit comprises a shaft connected to the optical assembly, and an actuator configured to rotate the shaft based on the first axis.

14. The camera module of claim 13, wherein the second driving unit further comprises a rotating element that interlocks with the actuator, the shaft is fitted into a hollow hole of the rotating element, the shaft comprises a groove that extends in a direction parallel to the first axis on an outer circumferential surface thereof, and the rotating element comprises a protrusion at least partially accommodated in the groove of the shaft.

15. The camera module of claim 14, wherein the second driving unit further comprises a spring fitted into the shaft, and when the optical assembly is pressed in a direction parallel to the first axis with respect to the second driving unit, the spring is compressed to provide a force pushing the optical assembly in the opposite direction.

16. An electronic device, comprising:
a camera module according to claim 1;
a housing, configured to accommodate the camera module; and
a display, configured to be visible externally through a portion of the housing,
wherein the optical assembly is located on a rear surface of the display when the optical assembly is retracted in the housing.

17. The camera module of claim 12, wherein the second driving unit comprises a rotating element configured to rotate together with the optical assembly, and comprising a protrusion that extends in a direction perpendicular to the rotating axis, and a stopper, configured to engage with the protrusion to limit a rotation range of the rotating element.

* * * * *